United States Patent
Jung

[11] Patent Number: 5,918,804
[45] Date of Patent: Jul. 6, 1999

[54] METHOD AND APPARATUS FOR PREVENTING ULTRASONIC VIBRATOR FROM BEING DAMAGED

[75] Inventor: Woong Jung, Seoul, Rep. of Korea

[73] Assignee: Daewoo Electronics Co., Ltd., Seoul, Rep. of Korea

[21] Appl. No.: 08/989,409

[22] Filed: Dec. 12, 1997

[30] Foreign Application Priority Data

Mar. 31, 1997 [KR] Rep. of Korea .................. 97-11938

[51] Int. Cl.$^6$ .................. B01F 3/02; G05D 21/00
[52] U.S. Cl. .................. 236/44 A; 261/DIG. 34; 261/DIG. 48; 366/127
[58] Field of Search .................. 366/127; 261/DIG. 34, 261/DIG. 48; 236/44 A, 44 E; 126/113

[56] References Cited

U.S. PATENT DOCUMENTS

| | | | |
|---|---|---|---|
| 4,643,351 | 2/1987 | Fukamachi et al. | 236/44 E |
| 5,343,551 | 8/1994 | Glucksman | 392/405 |
| 5,693,266 | 12/1997 | Jung | 261/142 |
| 5,722,587 | 3/1998 | Jung | 236/44 A |
| 5,769,313 | 6/1998 | You | 236/44 C |

FOREIGN PATENT DOCUMENTS 2 195 434  4/1988  United Kingdom.

Primary Examiner—William Wayner
Attorney, Agent, or Firm—Pillsbury Madison & Sutro LLP

[57] ABSTRACT

In a combination type humidifier having a heater and an ultrasonic vibrator, an art for preventing the ultrasonic vibrator from being thermally damaged due to a heat produced by the heater is disclosed. First, a current humidity of a space, a water temperature of a humidifying chamber and a target humidity set by a user are detected. When the current humidity is higher than the target humidity, a fan motor begins to operate for a rapid heat loss. Otherwise, when the target humidity is higher than the current humidity, an error message concerning the setting of the target humidity is displayed and the fan motor is driven for a predetermined time. The heater is controlled so that the water temperature of the humidifying chamber is kept below the limit temperature by using a result of comparing the water temperature of the humidifying chamber with a limit temperature that is set for protecting the ultrasonic vibrator while the ultrasonic vibrator and the heater are simultaneously operated by a user's selection. When a user selects a turbo mode, the turbo mode is changed into a mode in which a quantity of produced vapor is less than in the turbo mode, and then the ultrasonic vibrator is operated.

5 Claims, 6 Drawing Sheets

METHOD AND APPARATUS FOR PREVENTING ULTRASONIC VIBRATOR FROM BEING DAMAGED

BACKGROUND OF THE INVENTION

1. Field of the Invention

The present invention relates to a humidifier, and more particularly to a humidifier which has an ultrasonic vibrator together with a heater and can prevent the ultrasonic vibrator from being damaged due to a heat energy generated by the heater.

2. Description of the Prior Art

A humidifier is an apparatus that converts water into a mist in order to control a humidity of a space, wherein, as the means for converting the water into a mist, an ultrasonic vibrator is used or a heater is adapted additionally to the ultrasonic vibrator. The reason for adapting the heater is not only to sterilize the water, but also to produce a lot of vapor.

In using a humidifier, conditions during usage may influence the durability of the ultrasonic vibrator and the heater. In order to prevent the heater from being damaged, considering the fact that when a heating member is not immersed in water, the heater may be damaged by the overheating, the U.S. Pat. No. 5,343,551 discloses an art that indicates a lack of water by an alarm signal and thereby, a user can refill the water.

On the other hand, the ultrasonic vibrator has a vibrating member whose surface is coated by a coating material. If the temperature of the ultrasonic vibrator is kept over a limit temperature, then damage such as the ultrasonic vibrator being transformed because of thermal saturation and the coating material being detached from the vibrating member may gradually occur. Therefore, when the heater and the ultrasonic vibrator are simultaneously operated, the possibility that the ultrasonic vibrator is thermally damaged is high.

In FIG. 2, the structure of a conventional humidifier having a heater and an ultrasonic vibrator is illustrated. As known from the structure, while a heater 140 is being operated, a temperature of the water in a heating chamber 120 increases and thereby, a temperature of the water in a humidifying chamber 130 also increases. Thus, a temperature of the ultrasonic vibrator 150 in the humidifying chamber 130 also ascends. If the water temperature of the humidifying chamber 130 is kept over the limit temperature for a predetermined time, the ultrasonic vibrator 150 is thermally damaged so that a life of thereof is shortened. Accordingly, to lengthen the life of the ultrasonic vibrator 150 even though the heater 140 is being operated, it is necessary to control the water temperature of the humidifying chamber 130 so that it does not ascend over the limit temperature.

SUMMARY OF THE INVENTION

Therefore, it is an object of the present invention to provide a method and an apparatus to perform the method for preventing the ultrasonic vibrator from being thermally damaged by keeping the water temperature of a humidifying chamber under a limit temperature for maintaining a durability of the ultrasonic vibrator.

In order to accomplish the object of the present invention, there is provided a method for preventing an ultrasonic vibrator of a humidifier from being damaged comprising the steps of: i) detecting a current humidity and a water temperature of a humidifying chamber; ii) detecting a target humidity set by a user; iii) driving a fan motor when the current humidity is lower than the target humidity, displaying an error in the setting of the target humidity, and driving the fan motor only for a predetermined time when the current humidity is higher than the target humidity, and returning to step i); iv) controlling the heater so that the water temperature of the humidifying chamber is kept below the limit temperature by using a result of comparing the water temperature of the humidifying chamber with a limit temperature that is set for protecting the ultrasonic vibrator while the ultrasonic vibrator and the heater are simultaneously being operated by a user's selection; and v) changing a turbo mode, which is for producing a maximum quantity of the vapor and is selected by the user as an operation mode of the ultrasonic vibrator, into a lower mode in which a quantity of a produced vapor is less than in the turbo mode.

In order to accomplish the object of the present invention, there is provided an apparatus for preventing an ultrasonic vibrator of a humidifier from being damaged, comprising: means for detecting a current humidity of a space wherein the humidifier is located; means for detecting a temperature of a water within a humidifying chamber; means for heating a water within a heating chamber; means for ultrasonically vibrating the water within the humidifying chamber to change the water into a vapor; means for setting data of a target humidity of the space and an operation mode of the heating means and the ultrasonic vibrating means; means for controlling an operation of the heating means so that the temperature of the water within the humidifying chamber is kept below a predetermined temperature while the ultrasonic vibrating means and the heating means are being simultaneously operated, and for controlling the ultrasonic vibrating means to be operated in a mode in which less quantity of the vapor is produced than in a turbo mode in which a maximum quantity of the vapor is produced, when an operation mode of the ultrasonic vibrating means selected by a user is the turbo mode; and means for storing data processed by the controlling means and for processing data the controlling means.

According to the present invention, in case that a user selects a mode where the heater and the ultrasonic vibrator are simultaneously being operated, the heater is operated only when the water temperature of the humidifying chamber is lower than the temperature at which the ultrasonic vibrator may be thermally damaged or when the ultrasonic vibrator is operated in a mode that is one stage lower than a turbo mode, and so the ultrasonic vibrator is prevented from being damaged to improve the durability of the ultrasonic vibrator.

BRIEF DESCRIPTION OF THE DRAWINGS

The above object and other advantages of the present invention will become more apparent by describing in detail preferred embodiments thereof with reference to the attached drawings, in which.

DETAILED DESCRIPTION OF THE INVENTION

Hereinafter, a preferred embodiment of the present invention will be explained in more detail with reference to the accompanying drawings.

Figure 1:
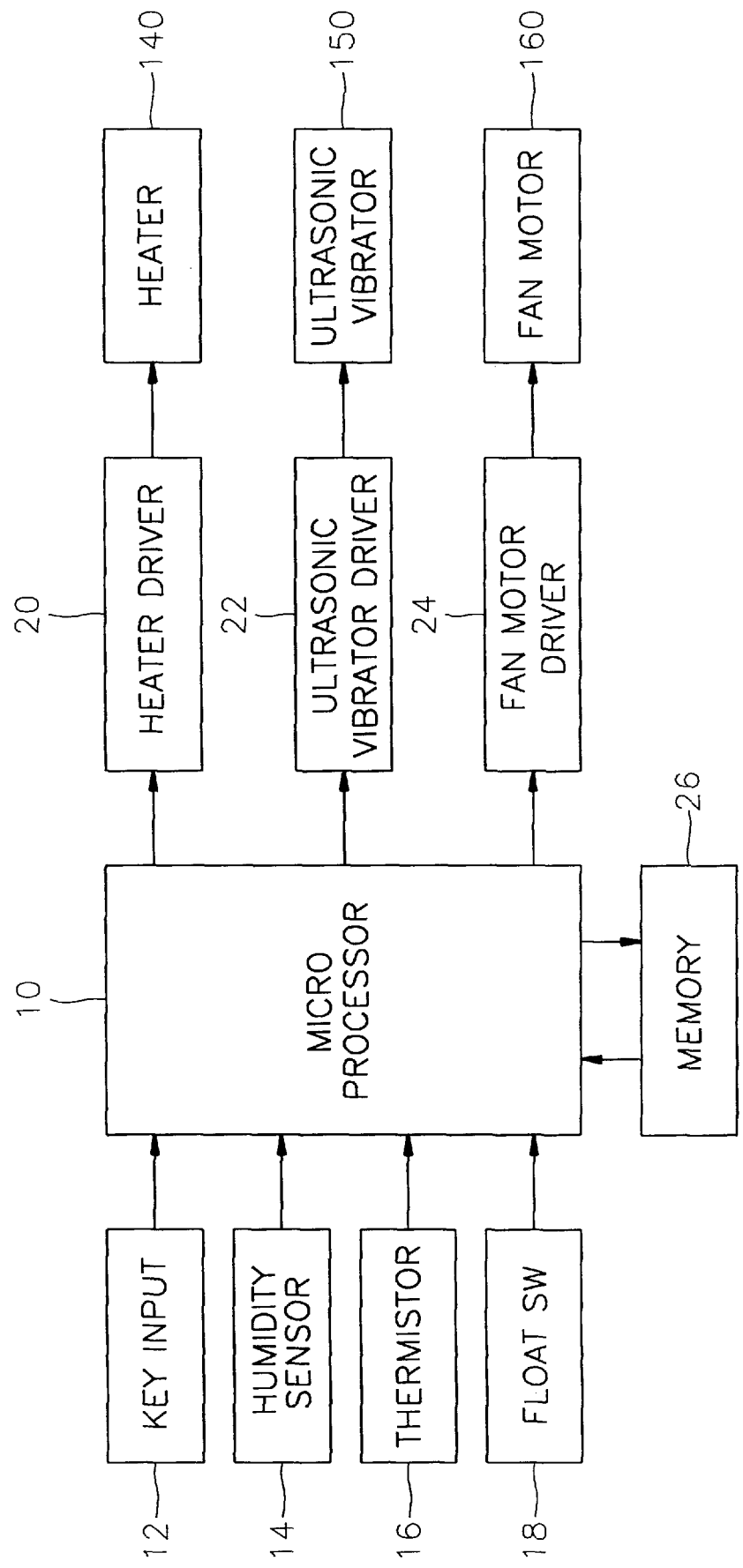
FIG. 1 is a block diagram showing the constitution of a humidifier that applies a method for preventing the ultrasonic vibrator from being damaged according to the present invention.
Figure 2:
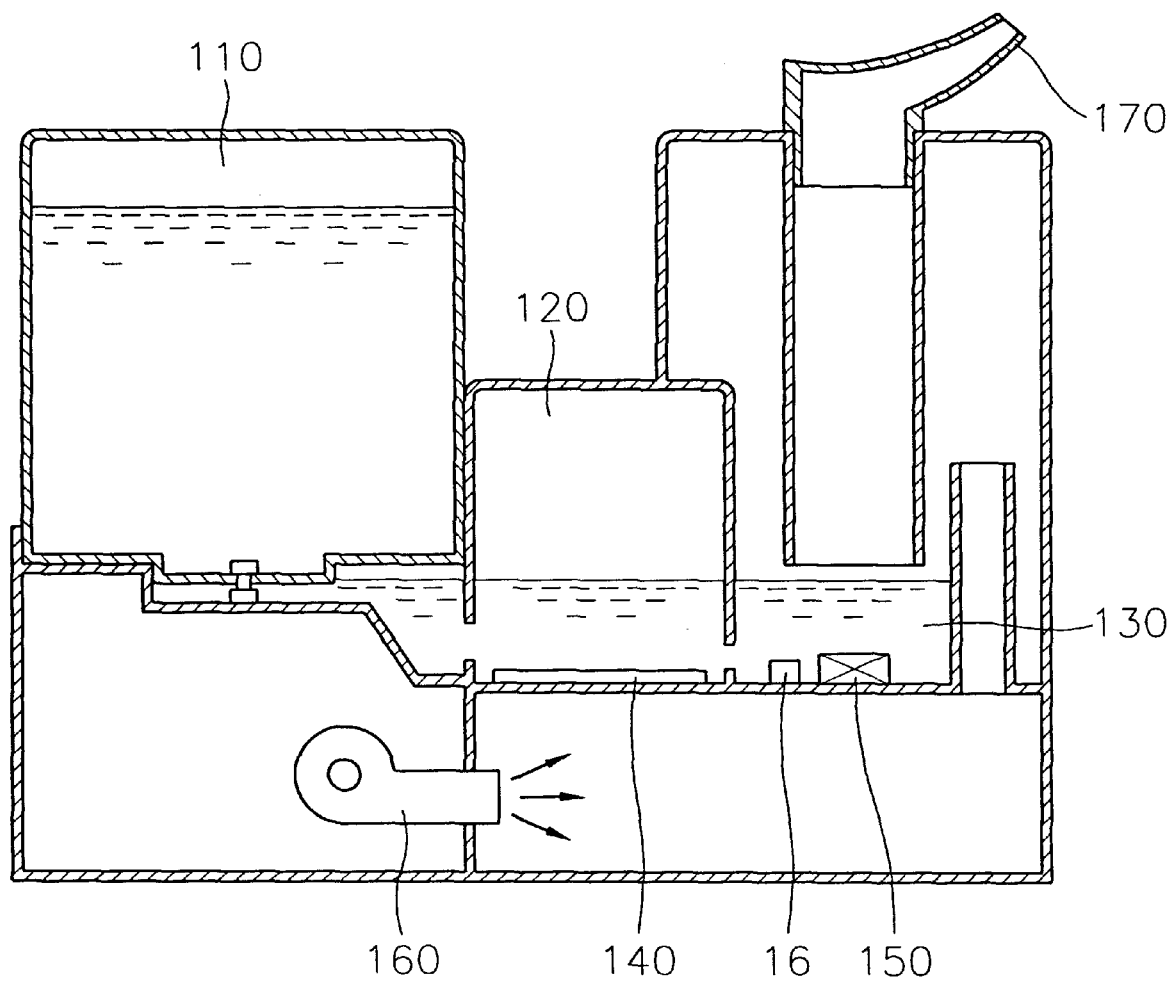
FIG. 2 is a sectional drawing showing an inner structure of the humidifier shown in FIG. 1.

FIG. 1 is a block diagram showing the constitution of a humidifier that applies a method for preventing the ultrasonic vibrator from being damaged according to the present invention, and FIG. 2 is a sectional drawing showing an inner structure of the humidifier shown in FIG. 1.

A combination type humidifier is such a humidifier where an ultrasonic vibrator is provided as a means for producing a vapor and a heater is further provided as a means for heating a water.

In FIGS. 1 and 2, a key input section 12 includes keys for setting general operation environments of a humidifier, for example, for setting a target humidity value of a space wherein the humidifier is located. A humidifier sensor 14 detects a current humidity of the space wherein the humidifier is located, and a float switch 18 is installed in a heating chamber 120 or a humidifying chamber 130 and is operated by the level of the water therein, which is flowed in from a water chamber 110. An ultrasonic vibrator 150, as known already, converts the water in the humidifying chamber 130 into a vapor by ultrasonically vibrating the water, and a heater 140 heats the water in the heating chamber 120 to sterilize the water and contributes to the total quantity of the produced vapor. A vibrator driver 22 and a heater driver 20 are controlled by a microprocessor 10 to operate the ultrasonic vibrator 130 and the heater 140 according to a selected operation mode. The microprocessor 10 provides the vibrator driver 22 and the heater driver 20 with a control signal to control the target humidity value. Various data processed by the microprocessor 10 and data for controlling the operation of the humidifier are stored in a data memory 26. By the control of the microprocessor 10, a fan motor driver 24 drives a fan motor 160 so as to discharge the vapor produced by the heater 140 and the ultrasonic vibrator 150 through an outlet 170.

Besides these components, the present invention further includes a temperature detector, such as thermistor 16, to detect a current water temperature of the humidifying chamber 130. The thermistor 16 is installed within the humidifying chamber 130.

In the present invention, the temperature of water in the humidifying chamber 130 is detected by using the thermistor 16, and the ultrasonic vibrator 150 is controlled so that it is not operated in the temperature range where the ultrasonic vibrator 150 may be damaged by using the detected temperature data, or so that an operation mode is not changed into a hazardous operation mode in which the ultrasonic vibrator 150 may be damaged, so the ultrasonic vibrator 150 is protected.

On the other hand, the microprocessor 10 further includes a program for the protection method of the ultrasonic vibrator according to the present invention.

Hereinafter, the method for preventing the ultrasonic vibrator from being damaged according to the present invention will be explained in more detail with reference to the accompanying drawings.

Figure 3A:
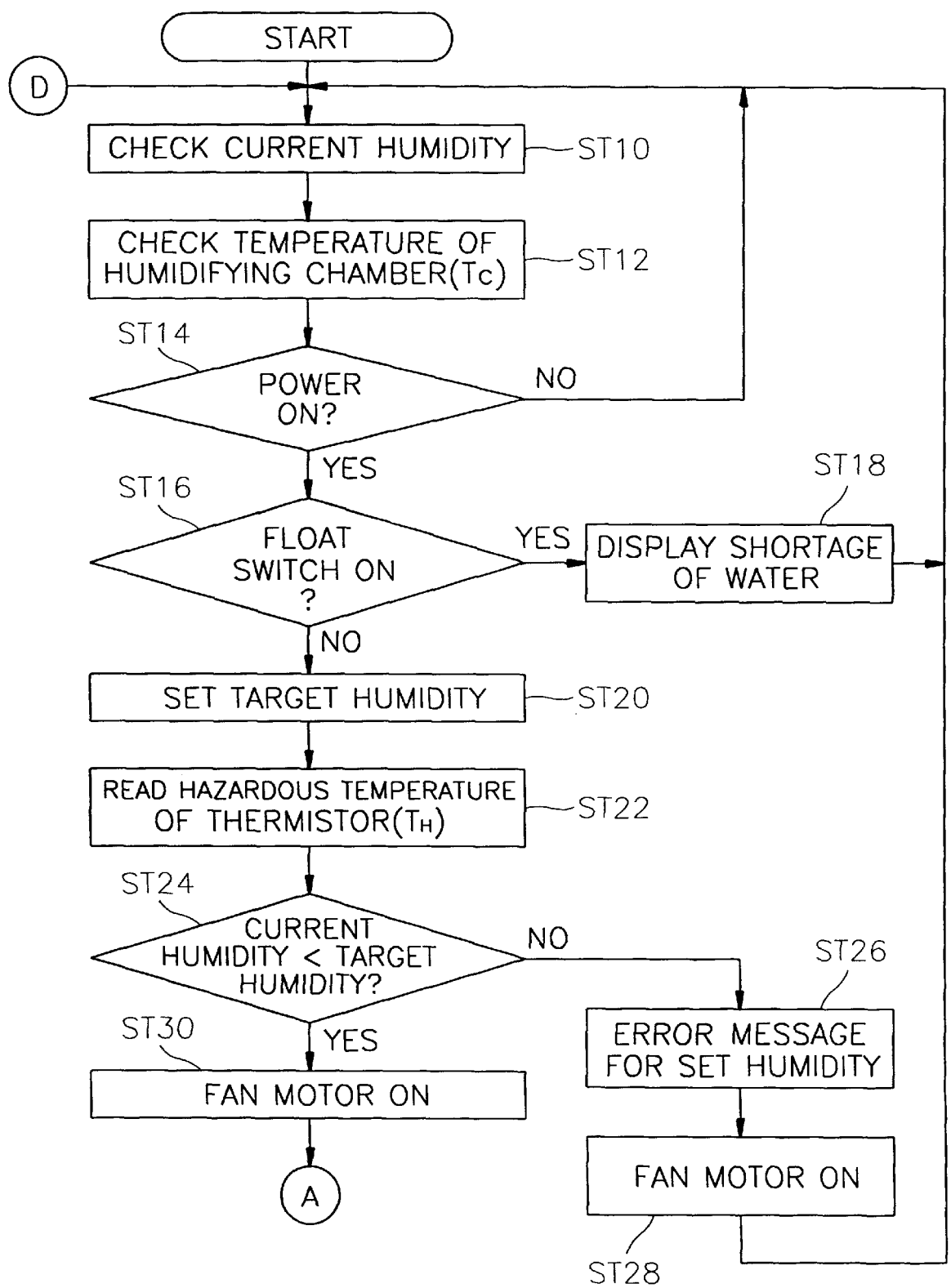
FIGS. 3A to 3C are flow charts illustrating a method for preventing the ultrasonic vibrator from being damaged according to the present invention.
Figure 3B:
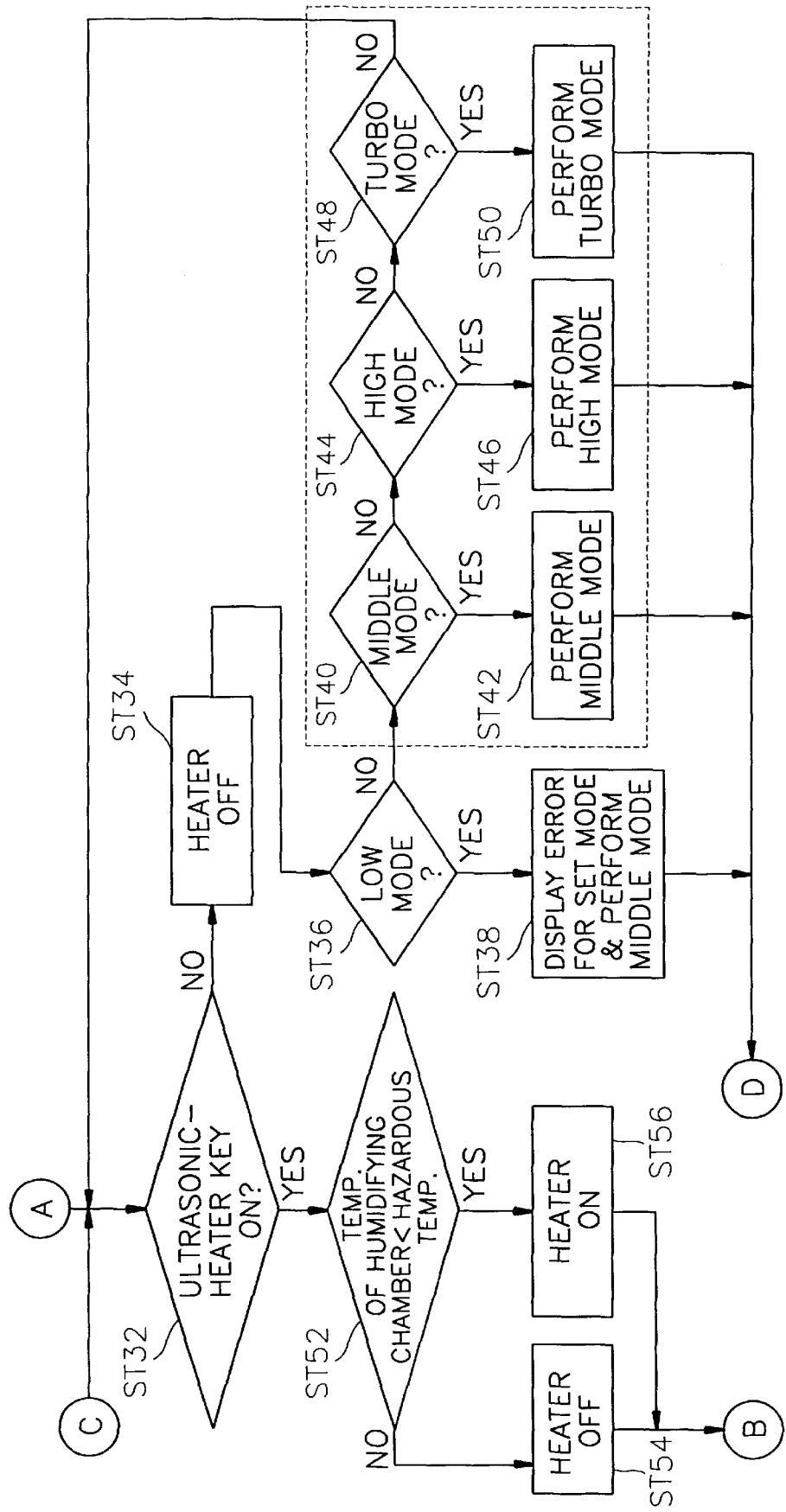
Figure 3C:
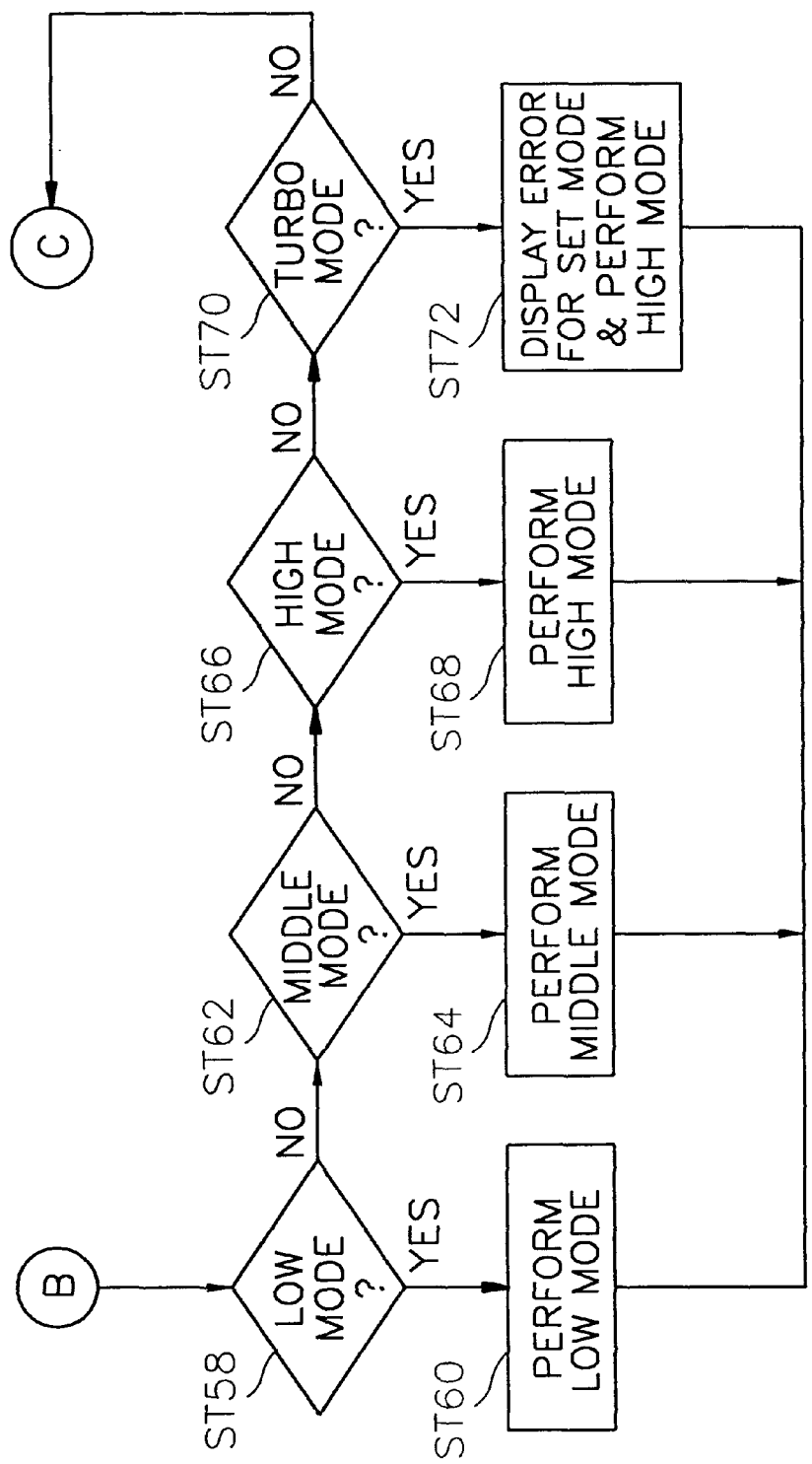

In FIGS. 3A to 3C, first of all, the humidity sensor 14 detects a current humidity of a space to be humidified to provide the microprocessor 10 with the detected humidity (ST 10). The thermistor 16 installed in the humidifying chamber 130 checks the water temperature of the humidifying chamber 130 and provides the temperature to the microprocessor 10 (ST 12). The data of the detected current humidity and the detected water temperature are stored in the memory 26.

When the power of a humidifier is switched on, which is checked by the microprocessor 10, a level of water in the humidifying chamber 130 is checked by the float switch 18 (ST 14, ST 16). On the basis of the check result, if the water level of the humidifying chamber 130 falls below a limit level, this fact is displayed by a displaying device, such as a buzzer or an LED (not shown), so that a user can recognize the fact (ST 18), and then a feedback to the detecting step of current humidity is performed (ST 10). When the water level of the humidifying chamber 130 falls below the limit level, the heater 140 and the ultrasonic vibrator 150 are not operated. If the heater 140 and the ultrasonic vibrator 150 are under operation, the heater 140 and the ultrasonic vibrator 150 are turned off. The reason is that the ultrasonic vibrator 130 may be damaged by keeping on the operation of the heater 140 and the ultrasonic vibrator 150 even though the water level of the humidifying chamber 130 falls below the limit level.

In case that the water level of the humidifying chamber 130 is over the limit level, information of a target humidity of a space set by a user through the key input section 12 is supplied to the microprocessor 10 and is stored in the memory 26 (ST 20).

Next, the detected current humidity and the set target humidity are compared (ST 24). If the current humidity is higher than the target humidity, this fact is displayed in an error message because the set value of the target humidity is not proper (ST 26). This case may result from an over-operation of the heater 140 and/or the ultrasonic vibrator 150, so the fan motor 160 is operated by a fan motor driver 24 for a predetermined time (ST 28). Consequently, the water temperature of the humidifying chamber 130 decreases, and an overheating of the ultrasonic vibrator 150 is averted.

On the other hand, in case that the current humidity is lower than the target humidity, first of all the operation of the fan motor 160 begins, and it is checked whether the user makes ON an ultrasonic-heater key (not shown) provided to the key input section 12 (ST 32). The ultrasonic-heater key is a key that is selected for a simultaneous operation of the heater 140 and the ultrasonic vibrator 150.

When the ultrasonic-heater key is not ON, the heater 140 is turned OFF and only the ultrasonic vibrator 150 is operated (ST 34). Also, checking operation of the ultrasonic vibrator operation mode selected by the user is performed (ST 36, ST 44, and ST 48). The ultrasonic vibrator operation mode, which are classified by a quantity of a produced vapor, consists of a low mode, a middle mode, a high mode and a turbo mode.

Figure 4A:
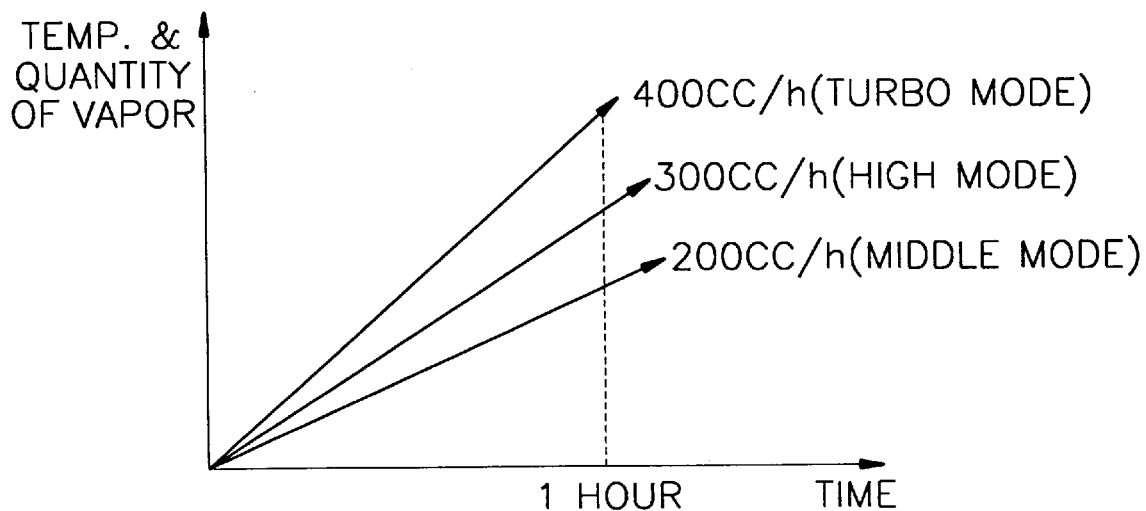
FIG. 4 is a graph illustrating the quantity of vapor produced with respect to the time for operating modes of the heater and the ultrasonic vibrator.
Figure 4B:
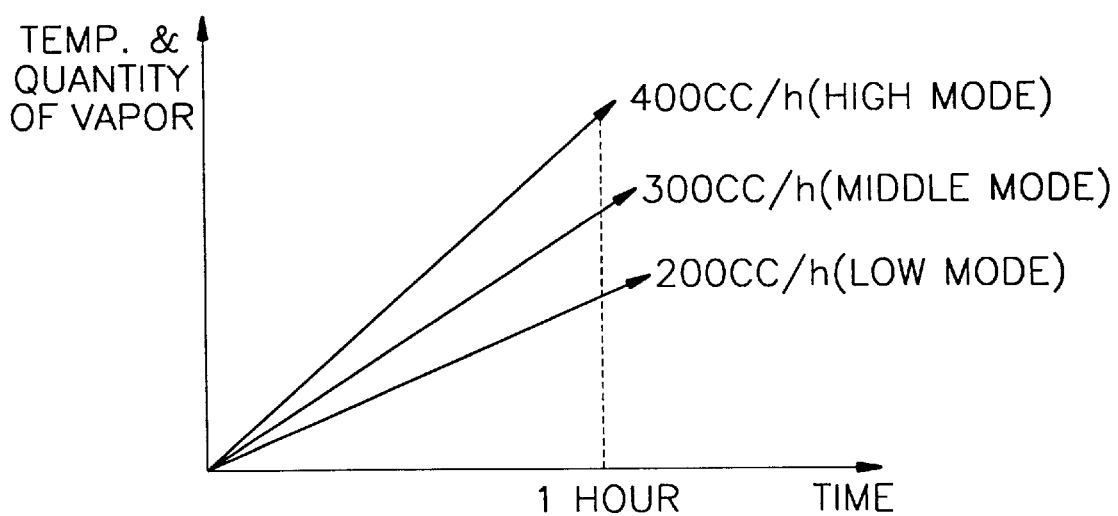

FIG. 4 shows the quantity of the produced vapor with respect to time for each operation mode, where (A) of FIG. 4 is a graph for the case where only the ultrasonic vibrator 150 is operated and (B) of FIG. 4 is a graph for the case where the ultrasonic vibrator 150 and the heater 140 are simultaneously operated. As known from the FIG. 4, the turbo mode is a mode for producing a maximum quantity and a high temperature of a vapor, and the low mode is a mode for producing a minimum quantity and a low temperature of a vapor. Even when the same mode is selected, FIG. 4 shows that the produced quantity of a vapor per hour is less in the case of (A) than in the case of (B).

If the selected ultrasonic vibrator operation mode is a mode from the middle mode to the turbo mode, the ultrasonic vibrator 150 is operated as selected operation mode (ST 38, ST 46, ST 50). However, if the selected operation mode is the low mode, then the selected operation mode is changed into the middle mode to operate the ultrasonic vibrator 150. The reason for changing the operation mode is that the quantity of produced vapor is too small when only the ultrasonic vibrator 150 is operated, and changing the operation mode into upper mode does not damage the ultrasonic vibrator 150.

When the ultrasonic-heater key is set ON, comparison of the water temperature of the humidifying chamber 130 that is detected by the thermistor 16 to a predetermined limit temperature is performed (ST 52). The limit temperature is defined as a temperature over which the ultrasonic vibrator 150 is thermally damaged, and is variable in accordance with some material characteristics of the ultrasonic vibrator 150. If the operation of the heater 130 is kept running in spite of the fact that the water temperature of the humidifying chamber 130 ascends continuously, the ultrasonic vibrator 150 may be gradually damaged due to thermal saturation as described above. In order to avert this damage, when the temperature of the water within the humidifying chamber 130 is higher than the limit temperature, the heater 140 is controlled to turned OFF by the microprocessor 10 and the heater driver 20 (ST 54). However, for the contrary condition, that is, when the temperature of the water within the humidifying chamber 130 is lower than the limit temperature, the heater 140 is controlled to operate according to the user's request (ST 56).

After these steps, checking of the ultrasonic vibrator operation mode selected by the user is performed (ST 58, ST 62, ST 66, and ST 70). In case that the selected operation mode is the turbo mode in which the quantity of a produced vapor is maximized, if the turbo mode is performed by itself without a mode change, then the ultrasonic vibrator 150 may be thermally damaged. To perform the turbo mode, a large current should be supplied to the ultrasonic vibrator 150 to raise a vibration energy. Consequently the quantity of motion of the ultrasonic vibrator 150 becomes larger, and this hinders the life of the ultrasonic vibrator. Therefore, when the selected mode is the turbo mode, an error message of the operation mode set by the user is displayed, and then the ultrasonic vibrator 150 is operated in the high mode instead of the turbo mode (ST 72). When taking into account the vapor made by the heater 140, it is possible to produce enough vapor by operating the ultrasonic vibrator 150 in the high mode, which is one level lower than the turbo mode.

If the selected operation mode is one of the modes except for the turbo mode, such as the low mode, the middle mode and the high mode, then the ultrasonic vibrator 150 is operated in the selected mode (ST 60, ST 64, and ST 68).

As described above, the present invention can give an advantage that the ultrasonic vibrator 150 is prevented from being thermally damaged by turning the heater 140 OFF in order to decrease the water temperature of the humidifying chamber 130 (ST 54), by operating the ultrasonic vibrator 150 after changing a selected operation mode into a safe operation mode (ST 72), or by driving the fan motor 160 to bring down a temperature of the water within the humidifying chamber 130 (ST 28).

Although the preferred embodiment of the invention has been described, it is understood that the present invention should not be limited to this preferred embodiment, but various changes and modifications can be made by one skilled in the art within the spirit and scope of the invention as hereinafter claimed.

What is claimed is:

1. A method for preventing an ultrasonic vibrator of a humidifier from being damaged, comprising the steps of:

i) detecting a current humidity and a water temperature of a humidifying chamber;

ii) detecting a target humidity set by a user;

iii) driving a fan motor when the current humidity is lower than the target humidity, displaying an error in setting of the target humidity, and driving the fan motor only for a predetermined time when the current humidity is higher than the target humidity and then returning to i) step;

iv) controlling the heater so that the water temperature of the humidifying chamber is kept below the limit temperature by using a result of comparing the water temperature of the humidifying chamber with a limit temperature that is set for protecting the ultrasonic vibrator while the ultrasonic vibrator and the heater are simultaneously operated by a user's selection; and v) changing a turbo mode, which is selected by the user for producing a maximum quantity of the vapor as an operation mode of the ultrasonic vibrator, into a lower mode in which a quantity of produced vapor is less than in the turbo mode.

2. A method as claimed in the claim 1, said method further comprising the step of changing a low mode into a mode in which a quantity of produced vapor is larger than in the low mode when an operation mode of the ultrasonic vibrator selected by the user is the low mode in which a minimum quantity of the vapor is produced, and operating the ultrasonic vibrator.

3. A method as claimed in the claim 1, said method further comprising the step of checking a water level of a humidifying chamber to display a state that the water level is below a limit level when the state occurs, and controlling said step i) to repeatedly perform said step i) until the humidifying chamber is supplemented.

4. An apparatus for preventing an ultrasonic vibrator of a combination type humidifier from being damaged, comprising;

means for detecting a current humidity of a space wherein the humidifier is located;

means for detecting a temperature of a water within a humidifying chamber;

means for heating a water within a heating chamber;

means for ultrasonic vibrating the water within the humidifying chamber to change the water into a vapor;

means for setting data of a target humidity of the space, and setting an operation mode of the heating means and the ultrasonic vibrating means;

means for controlling an operation of the heating means so that the temperature of the water within the humidifying chamber is kept below a predetermined temperature while the ultrasonic vibrating means and the heating means are simultaneously being operated, and controlling the ultrasonic vibrating means so that the ultrasonic vibrator operates in a mode in which less quantity of vapor is produced than in a turbo mode in which a maximum quantity of the vapor is produced, when an operation mode of the ultrasonic vibrating means selected by a user is the turbo mode; and means for storing data processed by the controlling means.

5. An apparatus claimed in the claim 4, wherein said means for detecting a temperature is a thermistor.

\* \* \* \* \*